(12) United States Patent
Xiao et al.

(10) Patent No.: US 11,783,258 B2
(45) Date of Patent: Oct. 10, 2023

(54) MULTIMODAL SENSING POSITIONING MODEL ORIENTED TO HIGH-RISK PRODUCTION ENVIRONMENT AND SYSTEM THEREOF

(71) Applicant: HUAZHONG UNIVERSITY OF SCIENCE AND TECHNOLOGY, Wuhan (CN)

(72) Inventors: Jiang Xiao, Wuhan (CN); Minrui Wu, Wuhan (CN); Huichuwu Li, Wuhan (CN); Hai Jin, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 531 days.

(21) Appl. No.: 17/247,238

(22) Filed: Dec. 4, 2020

(65) Prior Publication Data

US 2021/0390469 A1    Dec. 16, 2021

(51) Int. Cl.
*H04W 4/90*    (2018.01)
*G06Q 10/0635*    (2023.01)
(Continued)

(52) U.S. Cl.
CPC .......... *G06Q 10/0635* (2013.01); *G01S 5/013* (2020.05); *G01S 5/019* (2020.05);
(Continued)

(58) Field of Classification Search
CPC ........... H04W 4/30; H04W 4/38; H04W 4/29; H04W 4/80; H04W 4/024; H04W 4/025;
(Continued)

(56) References Cited

U.S. PATENT DOCUMENTS

| 9,224,096 B2* | 12/2015 | Oppenheimer ........... G06N 3/08 |
| 10,506,381 B2* | 12/2019 | Bonanno ............... H04W 4/029 |

(Continued)

FOREIGN PATENT DOCUMENTS

| CN | 106358154 A | * | 1/2017 | .......... H04W 64/006 |
| CN | 104390643 B | * | 5/2017 | ........... G01C 21/005 |

(Continued)

OTHER PUBLICATIONS

Park, Byungjae, and Sejin Lee. "Robust range-only beacon mapping in multipath environments." ETRI Journal 42.1 (2020): 108-117. (Year: 2020).*

(Continued)

*Primary Examiner* — Cuong H Nguyen
(74) *Attorney, Agent, or Firm* — Rimon Law; Michael Ye

(57) ABSTRACT

The present invention relates to a multimodal sensing positioning system orientated to a high-risk production environment, the positioning system comprising: at least one positioning terminal, configured to be worn by a to-be-positioned subject and use at least one positioning technique to conduct multimodal sensing positioning so as to identify a current location information of the subject in the high-risk production environment; and a monitoring terminal, communicating with the positioning terminal so as to remotely monitor the current location of the subject. The present invention improves positioning precision while ensuring realtimeness of multimodal positioning.

10 Claims, 3 Drawing Sheets

(51) Int. Cl.
*H04W 4/029* (2018.01)
*H04W 4/80* (2018.01)
*G01S 5/00* (2006.01)
*G01S 5/02* (2010.01)
*G01S 19/42* (2010.01)
*G06Q 10/0639* (2023.01)

(52) U.S. Cl.
CPC .......... *G01S 5/0252* (2013.01); *G01S 19/421* (2013.01); *G06Q 10/06395* (2013.01); *H04W 4/029* (2018.02); *H04W 4/80* (2018.02); *H04W 4/90* (2018.02); *G01S 5/012* (2020.05)

(58) Field of Classification Search
CPC ........... H04W 4/02; H04W 4/90; G01S 19/42; G01S 5/0263; G01S 5/013; G01S 5/0252; G01S 5/012; G01S 5/016
See application file for complete search history.

(56) References Cited

U.S. PATENT DOCUMENTS

| | | | | |
|---|---|---|---|---|
| 11,199,835 | B2* | 12/2021 | Cella | ................ G05B 19/41865 |
| 2015/0195682 | A1* | 7/2015 | Lee | ...................... H04W 4/029 |
| | | | | 455/456.1 |
| 2016/0127875 | A1* | 5/2016 | Zampini, II | .......... G01S 5/0226 |
| | | | | 370/311 |
| 2016/0202078 | A1* | 7/2016 | Scalisi | ............... G01C 21/3667 |
| | | | | 701/519 |
| 2018/0359609 | A1* | 12/2018 | Bonanno | ................ H04W 4/029 |

FOREIGN PATENT DOCUMENTS

| | | | | | |
|---|---|---|---|---|---|
| CN | 109298436 | A | * | 2/2019 | ............. G01S 19/42 |
| CN | 105247915 | B | * | 4/2019 | ........... G01C 21/206 |
| CN | 110286302 | A | * | 9/2019 | ......... G01R 31/1227 |
| JP | 2016024766 | A | * | 2/2016 | ......... H04B 10/1149 |
| WO | WO-2019018315 | A1 | * | 1/2019 | ........... G01C 21/165 |

OTHER PUBLICATIONS

Jimenez, Antonio R., et al. "A comparison of pedestrian dead-reckoning algorithms using a low-cost MEMS IMU." 2009 IEEE International Symposium on Intelligent Signal Processing. IEEE, 2009. (Year: 2009).*

Zhou, Z., T. Chen, and L. Xu. "An improved dead reckoning algorithm for indoor positioning based on inertial sensors." 2015 International Conference on Electrical, Automation and Mechanical Engineering. Atlantis Press, 2015.(Year: 2015).*

* cited by examiner

MULTIMODAL SENSING POSITIONING MODEL ORIENTED TO HIGH-RISK PRODUCTION ENVIRONMENT AND SYSTEM THEREOF

CROSS-REFERENCE TO RELATED APPLICATIONS

This application claims the benefit of the Chinese Patent Application No. CN202010548555.5 filed on Jun. 16, 2020, which is hereby incorporated by reference as if fully set forth herein.

BACKGROUND OF THE INVENTION

1. Technical Field

The present invention relates to the field of personnel positioning techniques, and more particularly to a multimodal-sensation positioning model orientated to a high-risk production environment and a system using the model.

2. Description of Related Art

In a high-risk production environment, precisely positioning workers at high risk is one of the key prerequisites to reasonable personnel management and to personal safety as well as property safety. However, for a production environment that is complex due to distinctiveness in terms of raw material, product and technology, the existing positioning means using single signal source are incompetent to provide precise personnel positioning. For example, in a petrochemical enterprise where petroleum raw materials are stored in huge steel tanks, these tanks can cause obstruction and interference to GPS-based positioning systems and lead to increased errors in positioning results of patrol personnel and even false negatives or false positives, undesirably increasing production costs.

The currently common solutions for positioning personnel in complex environments can be summarized into the following two typical positioning strategies with the highest usage rate:

The first one type represents multimodal positioning that provides high precision by fusing advantages of multiple positioning techniques. This type of positioning strategies work by adjusting weights according to the status of the positioning resources, such as the signal strength, the node amount and so on. Techniques with good positioning resources (such as the high signal-to-noise ratio and the large number of positioning nodes) provide positioning results more reliable than those from techniques with inferior positioning resources. Thus, by giving a high weight to well-resourced techniques, the positioning results can be closer to the fact. Meanwhile, by making less-resourced positioning techniques less weighted, false results can be effective prevented. For example, China Patent Publication No. CN109298436A discloses a multi-information method for indoor positioning and navigation, which comprises firstly acquiring a floor plan of an indoor space that provides GPS location information, geomagnetic data information and path data; having a mobile terminal using information from a built-in inertial sensor to figure out a current location; then acquiring geomagnetic data of the current location, and performing geomagnetic positioning using a geomagnetic matching algorithm; further, calibrating the current location according to a Bluetooth base station on an indoor calibration point; and at last, obtaining location information of a user by fusing multiple information fused, and realizing indoor navigation with reference to the path data of the floor plan. As another example, China Patent Publication No. CN104390643B discloses a method for indoor positioning based on fusion of multiple information, which comprises initializing an indoor navigation map using a magnetic sensor and a camera of a terminal; initializing a positioning system and an inertial system using the terminal according to local location coordinates; having the terminal collect angular information from the magnetic sensor and an accelerometer so as to conduct dead-reckoning; having the terminal conduct space absolute location calculation and feedback-based calibration of the inertial system; having the terminal estimate the current space location according to dead-reckoning information and space absolute positioning information; and having the terminal by inputting the dead-reckoning information and the space absolute positioning information as state information to a space location tracking filter. However, such a method needs all the signal receiving units to keep working, leading to high energy consumption. Additionally, since the known method involves PDR-based positioning, for eliminating path deviation caused by linearity errors of the IMU, it is necessary to make continuous correction of the tracking path using landmarks. As a result, selection and monitoring of the landmarks can bring about additional costs for personnel or positioning infrastructure.

To reduce energy consumption and infrastructure overheads, another type of the typical positioning strategies involves determining the environment the subject is in according to variations of some positioning resources, and then calling for suitable positioning techniques For example, China Patent Publication No. CN106358154A discloses a scalable modular method for indoor/outdoor seamless positioning, which works by collecting environmental characteristic data of different types of environment, sensing environment according to the collected environment characteristic data so as to determining the type of environment the subject is in, and selecting a suitable positioning approach according to type of environment, thereby realizing location estimation. Therein, the sensors used may include sound sensors, light sensors, temperature sensors, magnetometers, pressure sensor and/or humidity sensors, and the environment characteristic data include sound, light, electromagnetic fields, air pressures, temperatures and/or humidity in different types of environment. Further, the positioning means may include Wi-Fi-based fingerprint recognition, inertial positioning, geomagnetic fingerprint recognition, GNSS positioning, shadow matching, BLE positioning, FM-based fingerprint matching, visual positioning and AGNSS positioning. However, the existing method requires data collection and determination the take a number of seconds before it determines the environment a positioning terminal is in, meaning a relatively long delay.

In addition, since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with the related art more existing technical features as support according to relevant regulations.

SUMMARY OF THE INVENTION

In order to provide precise personnel positioning in high-risk production environments without increasing the overall production costs, the most commonly used strategies are of two types. Positioning systems of the first type use multiple positioning apparatuses to provide high precision positioning. In such a system, since there is a need to keep all its signal receiving units on, the costs are increased by high energy consumption and short service life in addition to high overheads. Besides, due to its dependency on landmark-based calibration, such a system requires high infrastructure costs. Positioning systems of the second type call suitable positioning techniques according to analysis results of environment data. This requires collection and analysis of various types of data and therefore usually accompanies excessive delay, making these systems less capable of realtime positioning, which seriously undermines personnel safety in high-risk production environments.

In view of the shortcomings of the prior art, the present invention provides a positioning system that is established on the basis of properties of high-risk production environments and uses crowdsourcing to conduct an environment reference map according to which realtime adjustment is made. The disclosed positioning system makes the conducting of the environment model and the realtime positioning two separate parts, and conducts a positioning technique reference map using environment indicator vectors, thereby preventing long delay otherwise caused by using a single signal to sense environment and then enabling positioning itself as seen in the commonly used existing strategies. The present invention also helps to prevent high energy consumption that would be required when realtime adjustment of the contribution ratio among various positioning techniques is performed according states of multiple types of signals. As compared to the commonly used existing strategies, the positioning system of the present invention improves positioning precision while ensuring realtimeness of multimodal positioning, thereby better protecting personnel in high-risk production environments. The disclosed positioning system further solves the problem of the commonly used existing strategies about low signal coverage in complex high-risk production environments where large-sized production facilities can cause blockage to a signal source.

The present invention provides a multimodal sensing positioning system orientated to a high-risk production environment, comprising: at least one positioning terminal, configured to be worn by a to-be-positioned subject and use at least one positioning technique to conduct multimodal sensing positioning so as to identify current location information of the to-be-positioned subject in the high-risk production environment; and a monitoring terminal, communicating with the positioning terminal so as to remotely monitor the current location of the to-be-positioned subject, the monitoring terminal comprises a trajectory-similarity calculating module, a sensing-model constructing module, and a map-constructing module, such that the positioning terminal is able to, in a beacon-absent environment, based on one or more of a trajectory similarity data, an environment-sensing model, and a positioning technique reference map obtained by the trajectory-similarity calculating module, the sensation-model conducting module, and the map-constructing module, respectively, selectively wake up the at least one positioning technique to conduct the multimodal-sensing positioning in a non-realtime environment sensing manner.

As used in the present invention, the term "beacon-absent environment" is as opposite to the environment in which landmark-based calibration is conducted as required by the existing positioning strategies as described previously. The existing PDR-based personnel positioning methods have to use landmarks to continuously correct the tracking path so as to eliminate path deviation caused by linearity errors from IMUs, and selection and monitoring of the landmarks can bring about additional costs for personnel or positioning infrastructure. As a solution to this, the present invention uses PDR positioning errors in fixed duration that are linear, independent of environmental variations, and relatively stable to provide a positioning system that assesses environmental characteristics without using any landmark.

As used herein, non-realtime environmental sensation is as opposite to realtime environmental sensation of the prior-art positioning strategies in which environment characteristic data is collected and analyzed in a realtime manner. A commonly used known positioning strategy works by collecting environmental characteristic data of different types of environment, sensing environment according to the collected environment characteristic data so as to determining the type of environment the subject is in, and selecting a suitable positioning approach according to type of environment, thereby realizing location estimation. As it relies on a large number of always-on sensors (including sound sensors, light sensors, temperature sensors, magnetometers, pressure sensors and/or humidity sensors). This requires collection and analysis of various types of data and therefore usually accompanies excessive delay, making these systems less reliable and seriously undermining personnel safety in high-risk production environments. As a solution to this, the present invention provides a positioning system makes the conducting of the environment model and realtime positioning two separate parts, and conducts a positioning technique reference map using environment indicator vectors, without involving realtime environmental sensation, thereby preventing long delay otherwise caused by using a single signal to sense environment and then enabling positioning itself as seen in the commonly used existing strategies.

In the present invention, selectively waking up at least one positioning technique is as opposite to making all signal receiving units always on and thus representing high consuming energy and high costs as required by the existing positioning strategies. While fused positioning takes advantages of various positioning techniques to improve positioning precision, such a positioning strategy has its weakness due to huge costs for energy consumption and equipment, and low applicability. As a solution to this, the present invention provides a positioning system in which positioning apparatuses are put into a stand-by state when not in use instead of receiving signals in a realtime manner. The positioning system uses a reference map to selectively determine at least one positioning technique suitable for the current environmental characteristics and wakes up positioning apparatuses corresponding thereto by making them come to an operation state from the stand-by state, so as to significantly reduce energy consumption and costs.

According to one preferred embodiment, the trajectory-similarity calculating module at least comprises a benchmark calculating unit and a reference calculating unit, the trajectory-similarity calculating module performs trajectory-similarity calculation on a benchmark behavioral trajectory and at least one reference behavioral trajectory calculated by the benchmark calculating unit and the reference calculating unit, respectively, in a predetermined timeslice to determine at least one trajectory similarity data for constructing the environment-sensing model.

According to one preferred embodiment, each said trajectory similarity data is related to the at least one positioning technique and at least one grid area in the high-risk production environment, defined by dynamic planning of the high-risk production environment of the map-constructing module.

China Patent Publication No. CN104390643B discloses a method for indoor positioning based on fusion of multiple information, the patented method requires cameras and magnetic sensors in the initial, indoor map phase. By comparison, the present invention in the environment map-conducting phase only needs to collect signal information from Bluetooth devices and IMUS, without using any camera to take images. The present invention uses a map-conducting module to conduct a positioning technique reference map of a high-risk production environment a priori. The positioning technique reference map has a sensing range much larger than that of existing environment characteristic sensors, which are typically optical or laser and sense up to merely 200 meters. By comparison, the map-conducting module of the present invention can reach an infinite distance in terms of data sensing. Meanwhile, the existing environment characteristic sensors are usually susceptible to metal or magnetic materials in environment and give errors and even false results. Similarly, they can easily fail under adverse weather conditions, such as downpours and heavy snow. By comparison, the positioning technique reference map of the present invention is independent of special materials in environment and adverse weather conditions, thus having good applicability.

According to one preferred embodiment, each said trajectory similarity data is related to one or more of the at least one positioning technique, at least one grid area in the high-risk production environment, defined by dynamic planning of the high-risk production environment of the map-constructing module, and personnel authorization and retention risk level corresponding to the at least one grid area.

According to one preferred embodiment, the sensation-model conducting module, according to the at least one trajectory similarity data calculated by the trajectory-similarity calculating module, constructs the environment-sensing model for determining the usable positioning technique(s).

China Patent Publication No. CN104390643B discloses a method for indoor positioning based on fusion of multiple information. The known method uses an inertial system for dead reckoning and performs calculation and correction of an absolute location of a subject using video images, landmarks and communication signals. However, processing video images manes a heavy workload and the landmarks require high overheads and maintenance costs. China Patent Publication No. CN109298436A discloses a multi-information method for indoor positioning and navigation. The prior-art method involves integrating GPS information, geomagnetic information and path data information that is derived from discrete grid points in an indoor plane into an indoor space distribution information plane. This approach is highly dependent on GPS location information collected through beacons that require high overheads and maintenance costs. Differently, in the present invention, positioning results obtained using other signals are compared with dead reckoning results to determine usable positioning techniques. The disclosed positioning system conducts an environment map and corrects dead reckoning results without using costly landmarks and image processing.

According to one preferred embodiment, the map-constructing module uses the environment-sensing model trained by the sensing-model constructing module to analyze positioning environment of each said grid area in the high-risk production environment and the positioning technique(s) suitable for the positioning environment of each said grid area.

China Patent Publication No. CN106358154A discloses a scalable modular method for indoor/outdoor seamless positioning. The known method use collected environment data to train an environmental sensation sorter, so that when a personnel subjects enter new environment, new data has to be collected and entered the sorter for analysis before positioning can be conducted. This represents a substantial delay. Differently, the positioning system of the present invention encodes environment characteristics by considering positioning differences of multiple signal sources, and conducts a positioning technique reference map to assign a certain area with a suitable positioning technique, thereby significantly improving realtimeness of the positioning system.

Preferably, the map-conducting module acquires the space location attribute and the time attribute (or the plant plane and the production schedule) through information communication with a plant-wise general control system. With reference to the space location attribute (or the plant plane), the details and layout of production apparatuses at various locations throughout the current production environment can be confirmed. With reference to the time attribute (or the production schedule), the operation duration and outputs of the production apparatuses can be confirmed. The map-conducting module divides the target area (i.e. the high-risk production environment) into multiple grid areas using imaginary vertical and horizontal lines. The map-conducting module sorts these grid areas according to the established space location attribute, and identifies them as risk grid areas, affected grid areas and normal grid areas. The risk grid areas correspond to places where chemical production apparatuses are located. The affected grid areas correspond to vacant lands around the places having chemical production apparatuses. The normal grid areas are places in the high-risk production environment other than the risk grid areas and affected grid areas and places correspond to vacant lands.

Preferably, the map-conducting module acquires an equipment attribute and a time attribute (or a chemical production apparatus information and a production operation time plan) according to a plant plane and a production schedule, so as to classify the risk grid areas into Level 1 retention risk grid areas, Level 2 retention risk grid areas and Level 3 retention risk grid areas. These levels reflect different degrees of risk personnel are subject to when staying in the risk areas. Level 1 retention risk grid areas correspond to places where hazardous chemicals are stored. Level 2 retention risk grid areas correspond to places where hazardous gases are present. Level 3 retention risk areas correspond to production areas having side effects of chemical production, being in a critical state or being close to explosive limit and radioactive areas. The grid areas defined by the map-conducting module are not only exclusive to the current high-risk production environment, but also related to the degrees of potential risks existing in specific sites of the high-risk production environment.

Preferably, the map-conducting module uses retention risk grid areas of Level 1 to Level 3 and pre-ranked risk scopes to determine affected grid areas that are located around Level 1 to Level 3 retention risk grid areas and not involved with other risk grid areas. These affected grid areas are Level 4 to Level 6 retention risk grid areas. Retention risk grid areas of Level 4 to Level 6 are determined according to degrees of risk to personnel at places around the affected area. The affected grid areas in an overlapped part of two places are classified according to the places having the higher degree of risk.

Preferably, the map-conducting module may acquire the personnel attribute by having information communication with the plant-wise general control system. Each of the positioning terminals is bound to one to-be-located subject. The personnel attribute is used to indicate authorization of a to-be-located subject who is allowed to conduct long-time activities in individual grid areas.

According to one preferred embodiment, the map-constructing module encodes each said grid area according to the environment analysis result determined by the environment-sensing model, so as to construct the positioning technique reference map by integrating all the grid areas.

According to a preferred mode, the positioning terminal comprises a data collecting module. The data collecting module is used to acquire one or more of an inertial sensing unit signal, a Bluetooth signal, a Wi-Fi signal, a geomagnetic signal, a light intensity signal, and an electromagnetic signal.

According to one preferred embodiment, the positioning system further comprises a cloud, to which one or more of the trajectory similarity data, the environment-sensing model, and the positioning technique reference map are uploaded by a monitoring processor in the monitoring terminal, so that a positioning processor in the positioning terminal is able to conduct the multimodal-sensing positioning in a non-realtime environment sensing manner.

The present invention further provides a multimodal-sensation positioning method orientated to a high-risk production environment, which at least comprises one or more of the following steps: dividing the positioning area into grid areas, and collecting at least one positioning signal in each said grid area; using environmental sensation to generate environmental characteristic codes for individual grid areas, and conducting a positioning technique reference map; performing rough positioning on a subject to determine the grid area he/she is in; reading the code corresponding to the grid area, and activating a corresponding positioning technique according to the code; and using multimodal fused positioning to precisely locate the subject.

The present invention further provides a multimodal sensing positioning method orientated to a high-risk production environment, wherein at least comprising one or more of steps of: roughly positioning a subject, and determining a grid area the subject is in; retrieving an retention risk level of the grid area based on the grid area where the current to-be-located subject is in; comparing a personnel authorization level of the current to-be-located subject and a personnel authorization level predetermined for the grid area; where the personnel authorization level of the current to-be-located subject does not match up the personnel authorization level of the grid area, comparing retention duration of the current to-be-located subject with the retention risk level corresponding to the grid area; and where the retention duration of the current to-be-located subject exceeds a duration threshold preset for the retention risk level, activating a high precision multimodal-sensation positioning mode for which only a trajectory similarity data is considered; or where the personnel authorization level of the current to-be-located subject matches up the predetermined personnel authorization level, or where the retention duration of the current to-be-located subject does not exceed the duration threshold preset for the retention risk level, activating a precise multimodal sensing positioning mode for which both the trajectory similarity data and energy consumption are considered.

Weight analysis of trajectory similarity data and energy consumption is used herein to determine priority of positioning techniques corresponding to individual grid areas. The positioning technique having the greatest weight in terms of both trajectory similarity data and energy consumption is the first to be woken up. Given the weight rating, it is possible to determine availability of a precise multimodal-sensation positioning mode in which a grid area may correspond to one or two positioning techniques. In this mode, the positioning system can satisfy requirements for both positioning precision and energy consumption. Preferably, by only considering the trajectory similarity data, the priority of positioning techniques corresponding to individual grid areas can be determined. Particularly, the positioning technique related to the highest trajectory similarity data is the first to be woken up. With the trajectory similarity data, it is possible to determine availability of a high precision multimodal-sensation positioning mode in which a grid area may correspond to at least three or more positioning techniques. In this mode, multiple positioning techniques are used for relatively high energy consumption positioning. With the multiple positioning techniques complementary to each other, high precision positioning of personnel can be accomplished in emergencies.

The present invention further provides a multimodal sensing positioning model orientated to a high-risk production environment, wherein the positioning model at least comprises positioning technique reference map regarding correlation among grid areas in the high-risk production environment, environment codes of the grid areas and at least one positioning technique, constructed from one or more of a trajectory similarity data, an environment-sensing model and a positioning technique indicator vector calculated by a trajectory-similarity calculating module, a sensation-model conducting module, and a map-conducting module in a beacon-absent environment, respectively, so that fusion positioning of the to-be-positioned subject is realized.

DETAILED DESCRIPTION OF THE INVENTION

For further illustrating the means and functions by which the present invention achieves the certain objectives, the following description, in conjunction with the accompanying drawings and preferred embodiments, is set forth as below to illustrate the implement, structure, features and effects of the subject matter of the present invention. In addition, the technical features described in the following embodiments of the present invention may be used in combination as long as no conflict is caused by doing so.

Figure 1:
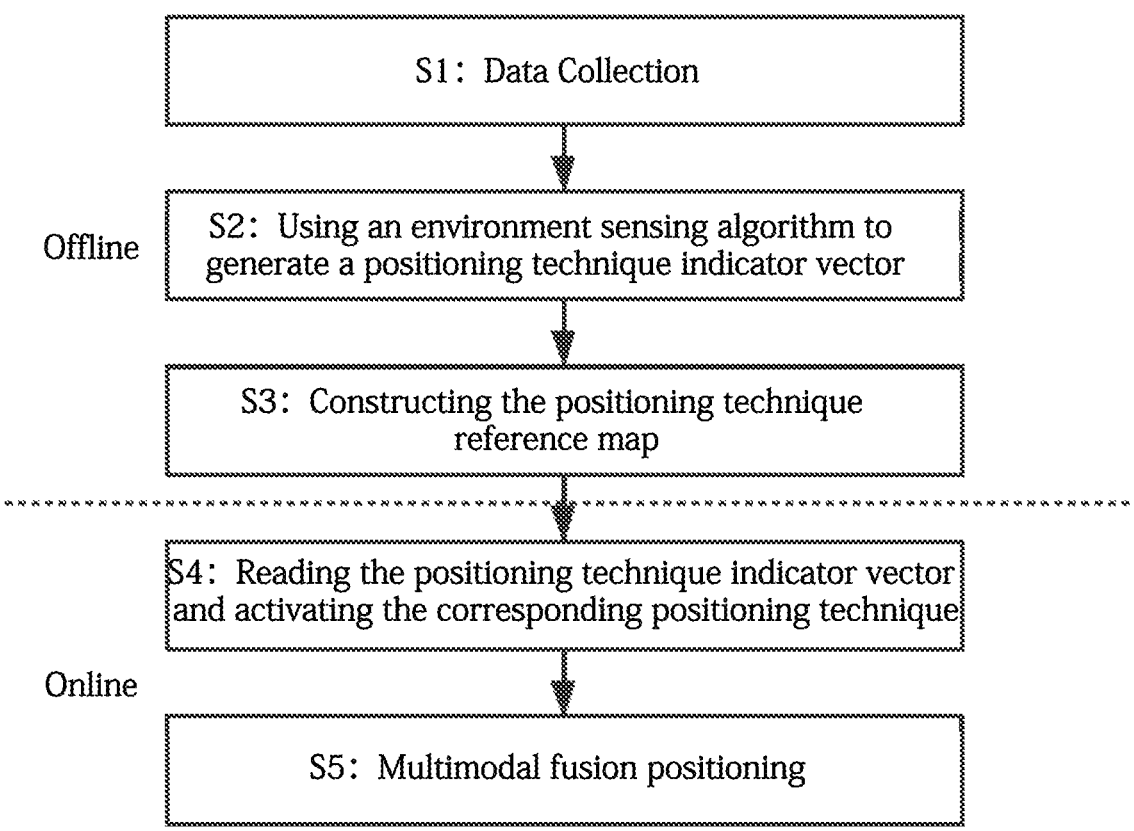
FIG. 1 is a schematic diagram of brief steps of a multimodal-sensation positioning method orientated to a high-risk production environment of the present invention.
Figure 2:
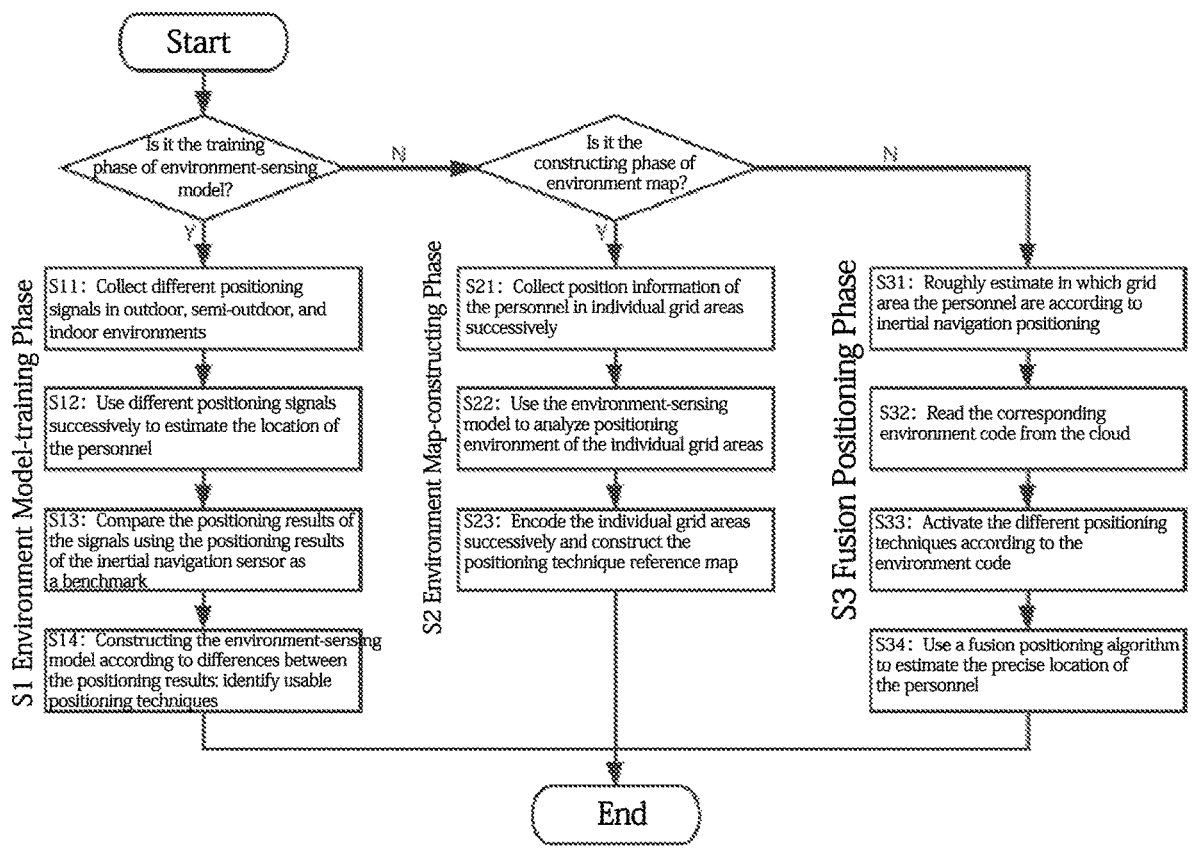
FIG. 2 is an operational diagram of a positioning system of the present invention.
Figure 3:
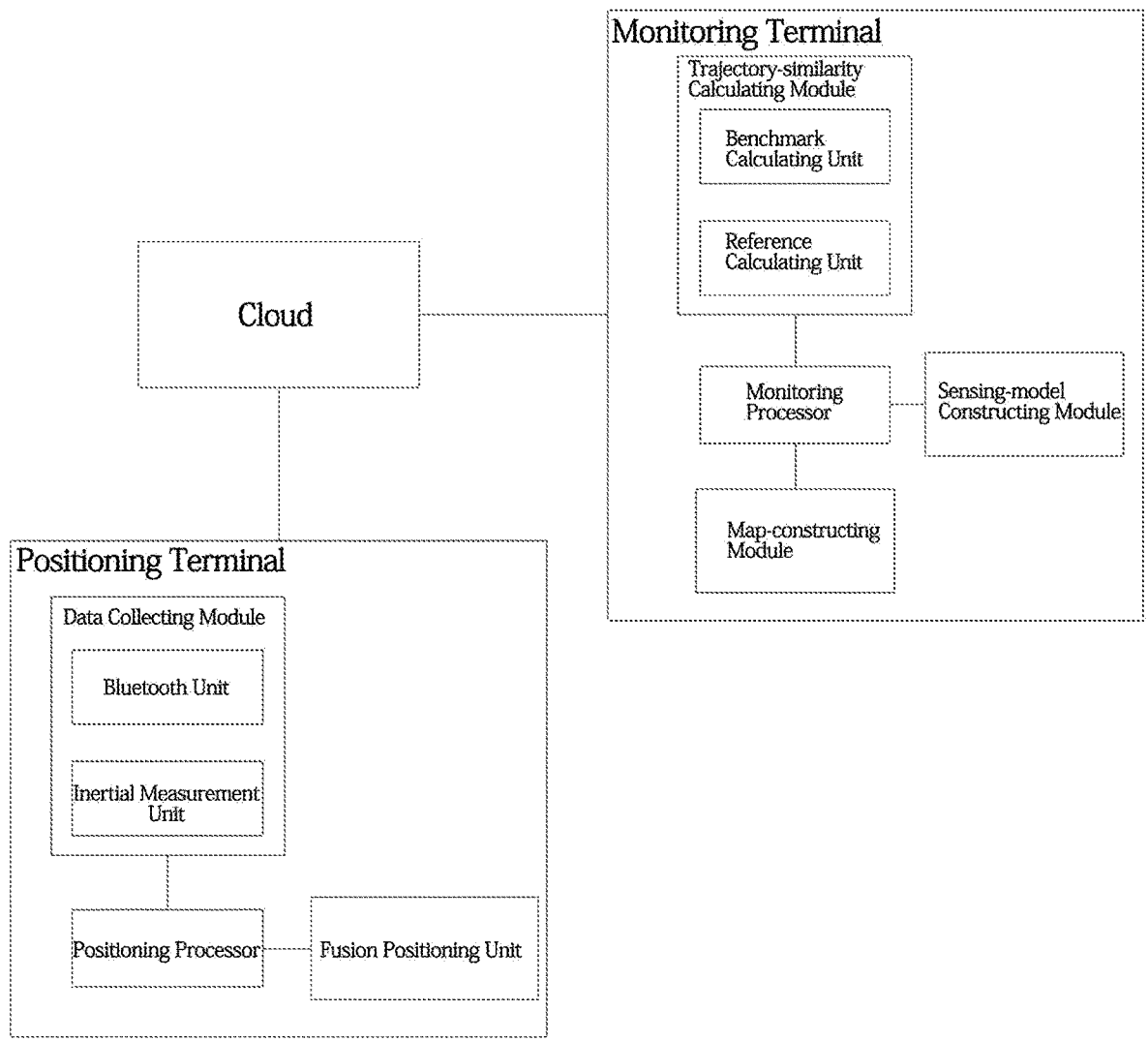
FIG. 3 is a simplified schematic diagram showing modular connection relationship of the positioning system of the present invention.

Before explaining the technical schemes of the present invention, the structure of the disclosed multimodal-sensation positioning system orientated to a high-risk production environment is described first. FIG. 1 is a schematic diagram of brief steps of a multimodal-sensation positioning method orientated to a high-risk production environment of the present invention. FIG. 2 is an operational diagram of a positioning system of the present invention. FIG. 3 is a simplified schematic diagram showing modular connection relationship of the positioning system of the present invention. For easy understanding, terms and abbreviations referred to in the present invention are clarified as below:

FIG. 1 schematically illustrates steps of a multimodal-sensation positioning method orientated to a high-risk production environment according to the present invention.

As shown, Step S1 involves dividing the positioning area into grid areas, and numbering the grids. A data collecting module of a positioning terminal collects positioning signals, such as inertial sensing unit signals, Bluetooth signals, Wi-Fi signals, geomagnetic signals, light intensity signals, electromagnetic signals and so on.

| Terms and Abbreviations | Expatiation |
| --- | --- |
| High-Risk Production Environment | This may include one or more of outdoor, semi-outdoor, and indoor environment and may refer to a complex environment in which precise positioning of personnel is hard to achieve using single-signal-source positioning due to particularity in terms of production material, product and process. |
| Multimodal Sensation | This opposite to a single positioning technique that is more specific to environment and less portable. Multimodal sensation uses various positioning communication techniques to provide various types of positioning signals. |
| Fused Positioning | Fused positioning is about combining all positioning techniques currently available, such as GPS positioning, base station positioning, Bluetooth positioning and sensor positioning. For example, in indoor environment, Wi-Fi positioning is less usable and more sensitive to exterior variations, yet has relatively stable positioning precision. On the other hand, inertial positioning is highly usable and less sensitive to the exterior variations, yet its error accumulation is undesirably serious. By using the two in combination, their respective shortcomings can be made up. |
| Beacon | A beacon may be a device that sends location information to mobile terminals using, for example, the BLE (Bluetooth Low Energy) technology. Beacons used in the present invention may include beacon equipment and cell phones distributed across various facilities such as airports, station kiosks, parking lots, malls, and offices. When a cell phone enters signal coverage of beacon equipment, the cell phone can receive location information of the beacon equipment and RSSI (Received Signal Strength Indicator) broadcasted by the beacon equipment, and then the cell phone can figure out the location it is on using the location information and the RSSI value. |
| RSSI | This is the acronym of Received Signal Strength Indication, which is a means to evaluate wireless signal strength between a signal transmitter and a signal receiver. According to the given signal-transmitting power and signal-receiving power of beacon nodes, by using a signal attenuation model over distance, distances between nodes can be determined through calculation. |
| PDR | This is the acronym of Pedestrian Dead Reckoning, which uses IMUs (Inertial Measurement Units) in a beacon-absent environment to measure, for example, acceleration, angular velocity, magnetism and pressure of an advancing person, and figure out the stride and direction of the person according to the obtained data, thereby positioning and tracking the personnel. It involves data processing for gait detection, stride and direction calculation. |
| IMU | This is the acronym of Inertial Measurement Unit, inertial measurement unit, which is a device for measuring triaxial attitude angle (or angular velocity) and acceleration of an object. Generally, one IMU includes three single-axis accelerometers and three single-axis gyroscopes. The accelerometers detect acceleration signals of the object with respect to three individual axes of a vehicle coordinate system. The gyroscopes detect angular velocity signals of the vehicle with respect to a navigation coordinate system, and measure the angular velocity and acceleration of the object in a three-dimensional space, thereby identifying the posture of the object. |
| INS | This is the acronym of an Inertial Navigation System, which measures acceleration of an aircraft for automatic integral operation, and thereby learns instantaneous velocity and instantaneous location of the aircraft. With all its components installed in a vehicle, of an inertial navigation system works independent of external information and leaks no radiative energy to the exterior, so is unlikely to get interfered, being a self-standing, autonomous navigation system. An inertial navigation system is a navigation parameter solving system using gyroscopes and accelerometers as its sensitive devices. Such a system conducts a navigation coordinate system according to outputs of the gyroscopes, and solving velocity and location of a vehicle in the navigation coordinate system using its accelerometers. |

The following description of the present invention is made with reference to the accompanying drawings.

The step S2 involves using an environmental sensation algorithm to generate a positioning technique indicator vector. The vector is not only for indicating positioning techniques suitable for the individual grid area, but also used as environmental characteristic codes of the area for conducting a positioning technique reference map. The step specifically involves: setting a fixed timeslice, and comparing behavioral trajectory results of other signals measured in a timeslice with results of benchmark-based positioning, and if the two are similar, giving the signals greater weights. In this way, all the signals are compared to obtain an environment indicator vector. For every reference point, an environment indicator vector is figured out, then all the indicator vectors are used to conduct the positioning technique reference map.

The step S3 involves collecting data in each said grid area, respectively, using environmental sensation of S2 to generate the environmental characteristic codes of individual grid areas, and conducting the positioning technique reference map.

The step S4 involves using the inertial navigation unit to roughly locate a to-be-located subject, e.g. so as to determining in which grid area he/she is, reading the environment code corresponding to the grid area, and activating the corresponding positioning technique according to the code.

The step S5 involves using a multimodal fused positioning technique to precisely locate the subject.

Referring to FIG. 2 that illustrates operations of a positioning system of the present invention and FIG. 3 that shows the preferred structure of positioning system, the foregoing positioning method are further detailed as follows.

In operation, the system performs primarily S1 (the environment model-training phase) and S2 (the environment map-conducting phase). The disclosed positioning system makes conducting the environment model and the performing realtime positioning two separate parts. Primarily, this includes encoding stable environment characteristics in advance in the model-training phase, then conducting the positioning technique reference map for indicating at least one positioning technique for each area, and afterward in the map-conducting phase adjust the positioning technique in a realtime manner according to the pre-built reference map.

The step S1 (the environment model-training phase) further comprises the following steps.

In Step S11, the data collecting module in the positioning terminal collects different positioning signals.

The positioning terminal contains at least two different types of positioning apparatuses. The present invention is a multimodal fused positioning system designed for a complex environment (such as a high-risk production environment). It requires at least two different positioning techniques, and uses one of them as the benchmark. The selected positioning technique shall have its positioning precision independent of or less dependent on interference from environment. Preferably, the positioning terminal at least has a Bluetooth unit and an inertial measurement unit. A pedestrian dead reckoning (PDR) algorithm using inertial measurement units (IMUS) is selected as the benchmark positioning technique to work with a positioning algorithm using Bluetooth signals for sensation of the current environmental characteristics.

In the present invention, the positioning terminal uses the data collecting module to collect IMU data in outdoor, semi-outdoor, and indoor environments, respectively, and to collect RSSI values of Bluetooth signals. Then the collected data are subject to noise-reduction. The positioning terminal transmits the denoised data to a monitoring terminal.

In Step S12, a trajectory-similarity calculating module in the monitoring terminal uses different positioning signals successively to estimate the location of the subject to be located.

The trajectory-similarity calculating module has its benchmark calculating unit use the PDR algorithm to figure out the location of the subject measured by the inertial navigation signal. Assuming that the initial location of the subject is $(x_1, y_1)$, the calculated next location is $(x_2, y_2)$, the displacement from the initial location to the next location is $S_{1,2}$, and the direction angle is $\theta_1$, the equation is as below:

$$\begin{cases} x_2 = x_1 + S_{12}\cos\theta_1 \\ y_2 = y_1 + S_{12}\sin\theta_1 \end{cases}.$$

The displacement value obtained by directly integrating the data measured by the accelerometers is less precise, so for calculating displacement, it is desired to consider the product of stride and step number. Therein, the stride can be figured out using various models (such as a constant model, a linear frequency model, and an empirical model), and the step number, or the gait detection, may be determined using time domain analysis (such as threshold detection or dynamic time warping) or frequency domain analysis. To find out the moving direction, dead reckoning is used together with the accelerometer data, the gyroscope data and the magnetometer data, by means of commonly used techniques (such as the Eulerian angle method, direction cosine matrix method, quaternion method and equivalent rotation vector method). By combining the calculated displacement and direction, the location of the subject can be determined. Additional positioning signals, such as Bluetooth signals as described herein, may be assigned with suitable techniques. The trajectory-similarity calculating module uses the reference calculating unit to measure the corresponding trajectory.

In Step S13, the trajectory-similarity calculating module compares the positioning results from other signals calculated using the reference calculating unit with the positioning results from the benchmark inertial navigation signals calculated using the benchmark calculating unit.

INS-based positioning is independent of external signals, and inertial navigation signals are more responsive, more independent, and resistant to interference while having higher short-time data stability.

In the existing PDR-based personnel positioning technology, for eliminating path deviation cause by linearity errors from IMUs, it is necessary to keep correcting the tracking path with respect to landmarks. However, selection and monitoring of these landmark can bring about additional costs for personnel and/or infrastructure. In order to reduce costs for personnel and overheads while achieving high positioning precision, the present invention discloses a positioning system that is able to assess environmental characteristics without using any landmark based on the fact that PDR positioning errors in fixed duration are relatively stable. Since PDR has linear positioning errors and is less sensitive to environmental variations, its positioning errors in fixed duration is relatively stable. Assuming that a timeslice is as long as 3 s, and the relative path variation measured using PDR is taken as the benchmark, the trajectory-similarity calculating module compares the positioning result from other signals with the PDR positioning result. The trajectory-similarity calculating module evaluate the positioning results from other signals according to the similarity of the relative path. As another example, Bluetooth signals can be converted into good positioning precision in a relatively open indoor environment, and thus the trajectory similarity between Bluetooth signals and PDR fluctuates in a stable range. In an environment where more obstacles are present, positioning results obtained from Bluetooth signals are less precise, and thus the trajectory similarity between the Bluetooth signals and PDR can show sharp variation.

In Step S14, the sensation-model conducting module in the monitoring terminal conducts the environment-sensing model according to differences between the positioning results obtained using the trajectory-similarity calculating module, and the environment-sensing model can be used to identify usable positioning techniques.

The trajectory-similarity calculating module uses the PDR-based result as the benchmark, and uses the "trajectory differences" of multiple positioning techniques in a given timeslice to determine positioning techniques that can be used for the current environment.

The sensation-model conducting module when conducting the environment-sensing model may use various sorting techniques, such as k-means, kNN, and SVM. The sorting model gives out a value in the interval [0,1]. That is, a confidence level is used as the sorting result. The sensation-model conducting module obtains the sorting results of the various positioning signals according to the trajectory differences, and conduct the environment-sensing model.

Step S2 is herein referred to as the environment map-conducting phase.

The objective of the present invention is to improve the realtimeness while maintaining high precision and low energy consumption of the positioning system according to the characteristics of high-risk production environments. For example, a chemical factory has a relatively complex layout but workers working therein are relatively few and conduct regular operations. Therefore, interference to positioning signals are mainly from the environmental factors. To meet the need in such an environment, the present invention encodes environment characteristics that are relatively stable to conduct a positioning technique reference map to indicate positioning techniques suitable for individual areas.

In Step S21, the map-conducting module in the monitoring terminal divides the high-risk production environment into grid areas, and collects location information of the workers in individual grid areas successively.

In Step S22, the map-conducting module uses the environment-sensing model trained in Step S14 to analyze positioning environment of the individual grid areas and identify the positioning techniques suitable for the environments of the individual grid areas.

In Step S23, the map-conducting module encodes the individual grid areas successively according to the analysis results from the environment-sensing model, and integrates all the grid areas to conduct the positioning technique reference map. The monitoring terminal uploads the obtained positioning technique reference map to the cloud. The monitoring terminal transmits the grid of the high-risk production environment as the result of the foregoing division to the positioning terminal.

Operations of the system further comprises Step S3 (or the fused positioning phase), which comprises the following steps.

In Step S31, during positioning, when a subject (i.e. a worker in the example) carrying a positioning terminal enters the targeted environment, the positioning processor in the positioning terminal first roughly estimate in which grid area the subject is according to the result of the PDR algorithm in the inertial measurement unit.

In Step S32, the positioning processor reads the environment code corresponding to the grid area in the positioning technique reference map from the cloud, so as to obtain the positioning technique suitable for the grid area.

In Step S33, the positioning processor activates the different positioning technique that corresponds to the environment code.

In Step S34, the fused positioning unit in the positioning terminal uses a fused positioning algorithm (such as particle filtering or weighted mean or more) to estimate the precise location of the subject with the confidence levels of the signals used as weights. The process is detailed below.

When the subject is in a relatively open indoor area, and the positioning processor of Step S33 has activated Bluetooth fingerprint positioning and PDR positioning algorithms according to the environment code, the data collecting module of Step S11 uses the Bluetooth unit to acquire the Bluetooth RSSI data of the current location and uses the inertial measurement unit to acquire the IMU data of the current location, thereby accomplishing Bluetooth-based positioning and IMU-based positioning. Taking a particle-filtering fused algorithm for example, assuming that the realtime positioning results of the two techniques are used as the particle state $S_t^i$, and the confidence levels of the signals acquired in Step S14 are uses as the weight $\omega_t^i$, the precise location of the subject can be calculated using the weighted mean of all the values of the particle state as below:

$$\hat{S}_t = \Sigma_{i=1}^N S_t^i \omega_t^i.$$

When the subject enters an area with obstacles from a relatively open indoor environment, the positioning precision based on Bluetooth signals decreases, so the weight of the positioning results in the fused positioning algorithm has to be lowered.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A multimodal sensing positioning system orientated to a high-risk production environment, comprising:
   at least one positioning terminal, configured to be worn by a to-be-positioned subject and use at least one positioning technique to conduct multimodal sensing positioning so as to identify current location information of the to-be-positioned subject in the high-risk production environment; and
   a monitoring terminal, communicating with the positioning terminal so as to remotely monitor the current location of the to-be-positioned subject,
   being characterized in that:
   the monitoring terminal comprises a trajectory-similarity calculating module,
   a sensing-model constructing module, and
   a map-constructing module,
   such that the positioning terminal is able to, use positioning errors in fixed duration that are linear and independent of environmental variations,
   based on one or more of trajectory similarity data,
   an environment-sensing model, and a positioning technique reference map obtained by the trajectory-similarity calculating module,
the sensing-model constructing module, and
the map-constructing module, respectively,
selectively wake up the at least one positioning technique to conduct the multimodal sensing positioning in a non-realtime environment sensing manner,
wherein the trajectory-similarity calculating module at least comprises a benchmark calculating unit and a reference calculating unit,
wherein a benchmark is a location of the subject measured by an inertial navigation signal calculated by a pedestrian dead reckoning (PDR) algorithm using inertial measurement units (IMUS),
the trajectory-similarity calculating module performs trajectory-similarity calculation on a benchmark behavioral trajectory and at least one reference behavioral trajectory calculated by the benchmark calculating unit and the reference calculating unit, respectively,
in a predetermined timeslice to determine at least one trajectory similarity data for constructing the environment-sensing model.

2. A multimodal sensing positioning model orientated to a high-risk production environment,
wherein the positioning model at least comprises a positioning technique reference map regarding correlation among grid areas in the high-risk production environment,
environmental characteristic codes of the grid areas and at least one positioning technique,
constructed from one or more of trajectory similarity data, an environment-sensing model and a positioning technique indicator vector calculated by a trajectory-similarity calculating module,
a sensation-model conducting module, and
a map-conducting module that uses positioning errors in fixed duration that are linear and independent of environmental variations, respectively, so that fusion positioning of the to-be-positioned subject is realized,
wherein the trajectory-similarity calculating module at least comprises a benchmark calculating unit and a reference calculating unit,
wherein a benchmark is a location of the subject measured by an inertial navigation signal calculated by a pedestrian dead reckoning (PDR) algorithm using inertial measurement units (IMUS),
the trajectory-similarity calculating module performs trajectory-similarity calculation on a benchmark behavioral trajectory and at least one reference behavioral trajectory calculated by the benchmark calculating unit and the reference calculating unit, respectively,
in a predetermined timeslice to determine at least one trajectory similarity data for constructing the environment-sensing model.

3. The positioning system of claim 1, wherein each said trajectory similarity data is related to the at least one positioning technique and at least one grid area in the high-risk production environment, defined by dynamic planning of the high-risk production environment of the map-constructing module.

4. The positioning system of claim 1, wherein each said trajectory similarity data is related to one or more of the at least one positioning technique, at least one grid area in the high-risk production environment, defined by dynamic planning of the high-risk production environment of the map-constructing module, and personnel authorization and retention risk level corresponding to the at least one grid area.

5. The positioning system of claim 3, wherein the sensing-model constructing module, according to the at least one trajectory similarity data calculated by the trajectory-similarity calculating module, constructs the environment-sensing model for determining the usable positioning technique(s).

6. The positioning system of claim 5, wherein the map-constructing module uses the environment-sensing model trained by the sensing-model constructing module to analyze positioning environment of each said grid area in the high-risk production environment and the positioning technique(s) suitable for the positioning environmental characteristics of each said grid area.

7. The positioning system of claim 6, wherein the map-constructing module encodes each said grid area according to the analysis result determined by the environment-sensing model, so as to construct the positioning technique reference map by integrating all the grid areas.

8. The positioning system of claim 7, wherein the positioning system further comprises a cloud, to which one or more of the trajectory similarity data, the environment-sensing model, and the positioning technique reference map are uploaded by a monitoring processor in the monitoring terminal, so that a monitoring processor in the positioning terminal is able to conduct the multimodal sensing positioning in a non-realtime environment sensing manner.

9. A multimodal sensing positioning method orientated to a high-risk production environment, wherein at least comprising steps of:
positioning a subject, and determining a grid area the subject is in;
retrieving a retention risk level of the grid area based on the grid area where the current to-be-located subject is in;
comparing a personnel authorization level of the current to-be-located subject and a personnel authorization level predetermined for the grid area;
where the personnel authorization level of the current to-be-located subject does not match up the personnel authorization level of the grid area, comparing retention duration of the current to-be-located subject with the retention risk level corresponding to the grid area; and
where the retention duration of the current to-be-located subject exceeds a duration threshold preset for the retention risk level, activating a high precision multimodal-sensation positioning mode for which only a trajectory similarity data is considered; or
where the personnel authorization level of the current to-be-located subject matches up the predetermined personnel authorization level, or where the retention duration of the current to-be-located subject does not exceed the duration threshold preset for the retention risk level, activating a precise multimodal sensing positioning mode for which both the trajectory similarity data and energy consumption are considered
wherein a trajectory-similarity calculating module at least comprises a benchmark calculating unit and a reference calculating unit,
wherein a benchmark is a location of the subject measured by an inertial navigation signal calculated by a pedestrian dead reckoning (PDR) algorithm using inertial measurement units (IMUS),
the trajectory-similarity calculating module performs trajectory-similarity calculation on a benchmark behavioral trajectory and at least one reference behavioral trajectory calculated by the benchmark calculating unit and the reference calculating unit, respectively, in a predetermined timeslice to determine at least one trajectory similarity data for the high precision multimodal-sensation positioning mode.

10. The positioning system of claim 4, wherein the sensing-model constructing module, according to the at least one trajectory similarity data calculated by the trajectory-similarity calculating module, constructs the environment-sensing model for determining the usable positioning technique(s).

* * * * *